US010104387B2

United States Patent
Moguillansky et al.

(10) Patent No.: US 10,104,387 B2
(45) Date of Patent: Oct. 16, 2018

(54) JPEG IMAGE TO COMPRESSED GPU TEXTURE TRANSCODER

(71) Applicant: Futurewei Technologies, Inc., Plano, TX (US)

(72) Inventors: Jeff Moguillansky, San Diego, CA (US); Anthony Mazzola, Ramona, CA (US)

(73) Assignee: Futurewei Technologies, Inc., Plano, TX (US)

( * ) Notice: Subject to any disclaimer, the term of this patent is extended or adjusted under 35 U.S.C. 154(b) by 90 days.

(21) Appl. No.: 14/990,963

(22) Filed: Jan. 8, 2016

(65) Prior Publication Data
US 2017/0201758 A1    Jul. 13, 2017

(51) Int. Cl.
| G06K 9/36 | (2006.01) |
| H04N 19/40 | (2014.01) |
| H04N 19/136 | (2014.01) |
| H04N 19/176 | (2014.01) |
| H04N 19/426 | (2014.01) |
| H04N 19/44 | (2014.01) |
| H04N 19/70 | (2014.01) |

(52) U.S. Cl.
CPC ........... *H04N 19/40* (2014.11); *H04N 19/136* (2014.11); *H04N 19/176* (2014.11); *H04N 19/426* (2014.11); *H04N 19/44* (2014.11); *H04N 19/70* (2014.11)

(58) Field of Classification Search
USPC ........ 341/106; 345/419, 582; 348/222.1, 43, 348/234; 375/240.24; 382/162, 166, 382/225, 238, 243
See application file for complete search history.

(56) References Cited

U.S. PATENT DOCUMENTS

| 5,204,738 A * | 4/1993 | Aragaki ................. H04N 1/646 358/1.9 |
| 5,729,228 A * | 3/1998 | Franaszek ........... H03M 7/3086 341/106 |
| 6,356,588 B1 * | 3/2002 | Otto ........................ G06T 9/005 375/240.03 |
| 7,787,691 B2 * | 8/2010 | Strom ..................... G06T 9/005 382/166 |

(Continued)

FOREIGN PATENT DOCUMENTS

| CN | 101137060 | 3/2008 |
| CN | 103841451 | 6/2014 |

OTHER PUBLICATIONS

Strom, J., et al., "ETC2: texture compression using invalid combinations," Graphics Hardware (2007), ACM Press.*

(Continued)

*Primary Examiner* — Xuemei Chen
(74) *Attorney, Agent, or Firm* — Schwegman Lundberg & Woessner, P.A.

(57) ABSTRACT

In an example embodiment, a received JPEG image compression format image includes one or more minimum coded units (ICUs). Each MCU is decoded using an image compression format decoder. Each decoded MCU is then split into multiple decoded subblocks. Each decoded subblock can then be encoded into texture compression format using a texture compression format encoder. Each encoded texture compression format subblock can then be passed to a graphical processing unit (GPU) for processing.

20 Claims, 7 Drawing Sheets

(56) References Cited

U.S. PATENT DOCUMENTS

| | | | | |
|---|---|---|---|---|
| 8,144,981 B2* | 3/2012 | Pettersson | | G06T 9/008 |
| | | | | 382/162 |
| 8,325,993 B2* | 12/2012 | Dinerstein | | G06K 9/00067 |
| | | | | 382/115 |
| 8,447,103 B2* | 5/2013 | Rasmusson | | G06T 9/00 |
| | | | | 382/166 |
| 8,457,417 B2* | 6/2013 | Strom | | G06T 9/001 |
| | | | | 348/234 |
| 8,577,164 B2* | 11/2013 | Strom | | H04N 19/176 |
| | | | | 382/243 |
| 8,655,063 B2* | 2/2014 | Strom | | G06T 15/04 |
| | | | | 382/166 |
| 8,831,341 B2* | 9/2014 | Berent | | H04N 1/644 |
| | | | | 345/582 |
| 8,977,062 B2* | 3/2015 | Gonzalez | | G01S 7/2927 |
| | | | | 382/225 |
| 8,995,764 B2* | 3/2015 | Strom | | G06T 9/004 |
| | | | | 382/162 |
| 9,041,773 B2* | 5/2015 | Chen | | H04N 13/026 |
| | | | | 348/43 |
| 9,280,834 B2* | 3/2016 | Strom | | G06T 9/00 |
| 9,326,000 B2* | 4/2016 | Zhao | | H04N 19/45 |
| 9,478,069 B2* | 10/2016 | Strom | | G06T 17/00 |
| 9,655,593 B2* | 5/2017 | Kawashima | | A61B 8/5207 |
| 9,679,348 B2* | 6/2017 | Smithers | | G06T 1/60 |
| 2007/0086528 A1* | 4/2007 | Mauchly | | H04N 19/174 |
| | | | | 375/240.24 |
| 2010/0265347 A1* | 10/2010 | Agvard | | G06F 17/30265 |
| | | | | 348/222.1 |
| 2013/0120593 A1 | 5/2013 | Shen et al. | | |
| 2014/0050414 A1* | 2/2014 | Strom | | G06T 9/00 |
| | | | | 382/238 |
| 2015/0009205 A1* | 1/2015 | Wan | | H04N 19/90 |
| | | | | 345/419 |
| 2015/0093036 A1 | 4/2015 | Park et al. | | |
| 2015/0256789 A1 | 9/2015 | Hu | | |
| 2015/0356387 A1* | 12/2015 | Hirano | | G06K 15/1878 |
| | | | | 358/1.9 |
| 2017/0025098 A1* | 1/2017 | Keramidas | | G09G 5/026 |

OTHER PUBLICATIONS

"International Application No. PCT/CN2016/111923, International Search Report dated Mar. 29, 2017", (dated Mar. 29, 2017), 5 pgs.

* cited by examiner

JPEG IMAGE TO COMPRESSED GPU TEXTURE TRANSCODER

TECHNICAL FIELD

The present disclosure relates to computer technology. More specifically, the present disclosure relates to a transcoding a JPEG-encoded image to texture compression format.

BACKGROUND

Joint Photographic Experts Group (JPEG) is a popular lossy image compression method commonly used to compress digital images. JPEG uses a form of compression based on a discrete cosine transform (DCT). The operation converts each frame/field of the video source from the spatial (2D) domain into a frequency domain (also known as a transform domain). High-frequency information, such as sharp transitions in intensity and color hue, is then discarded. In the transform domain, information is reduced through a process known as quantization, which optimally reduces a large number scale (with different occurrences of each number) into a smaller one. The quantized coefficients are then sequenced and losslessly packed into an output bitstream.

Many types of images are commonly stored in JPEG format, including application textures for applications running on mobile devices, such as smartphones. Many computing devices, such as desktop and laptop computers, and more recently mobile devices such as smartphones and tablets, have graphical processing units (GPUs) that augment central processing units (CPUs) by providing a dedicated processor for performing graphics functions, such as transforms and rendering. GPUs typically utilize a texture compression format, such as Ericsson Texture Compression (ETC1, or more recently, ETC2).

In order to utilize a GPU on a JPEG image, it is often desirable to encode the JPEG in ETC2 format, but in order to do this an application first has to decode the JPEG image to a raw image buffer, stored in the RGB 888 format, and then encode it into ETC2. This process, however, is inefficient, wastes power, and wastes memory, which can be of significant value on low-memory, battery-constrained devices, such as a smartphones and tablets.

Storing textures directly in texture compression formats such as ETC2 generally require more memory than JPEG image compression format. Additionally, texture compression formats such as ETC2 are generally of lower lower quality than JPEG image compression format.

SUMMARY

In a first example embodiment, a system is provided comprising: a graphical processing unit (GPU); an image compression format-to-texture compression format transcoder to convert an image stored in an image compression format into a plurality of blocks represented in a texture compression format, the image compression format-to-texture compression format transcoder comprising an image compression format decoder to decode the image into one or more decoded blocks; an image compression format splitter to split each decoded block into multiple decoded subblocks, the splitting to allow reducing or minimizing the number of colors needed to represent pixel data contained in each of the multiple decoded subblocks; and one or more texture compression format encoders configured to encode each of the multiple decoded subblocks into a block in a texture compression format by converting a colorspace of the decoded subblock to YUV and using the converted colorspace to determine whether to encode the subblock using a single base color, two base colors or other applicable number of base colors; and a bus to transfer the plurality of texture compression format blocks to the GPU for processing.

In a second example embodiment, a system is provided comprising: a graphical processing unit (GPU); a Joint Photographic Experts Group (JPEG)-to-Ericsson Texture Compression (ETC2) transcoder to convert a JPEG image into a plurality of ETC2 blocks, the JPEG-to-ETC2 transcoder comprising: a JPEG decoder to decode the JPEG image into one or more decoded blocks; a JPEG splitter to split each decoded block into multiple decoded subblocks; and one or more ETC2 encoders configured to encode each of the multiple decoded subblocks into an ETC block; and a bus to transfer the plurality of ETC2 blocks to the GPU for processing.

In a third example embodiment, a non-transitory computer-readable storage medium is provided comprising instructions that, when executed by at least one processor of a machine, cause the machine to perform operations comprising: receiving a JPEG image, the JPEG image comprising one or more minimum coded units (MCUs); decoding each MCU using a JPEG decoder; splitting each decoded MCU into multiple decoded subblocks; encoding each decoded subblock into ETC2 using an ETC2 encoder; and passing each encoded ETC2 subblock to a graphical processing unit (GPU) for processing.

DETAILED DESCRIPTION

In the following description, reference is made to the accompanying drawings, which form a part hereof, and in which are shown by way of illustration specific embodiments which may be practiced. These embodiments are described in sufficient detail to enable those skilled in the art to practice the subject matter disclosed herein, and it is to be understood that other embodiments may be utilized and that structural, logical, and electrical changes may be made without departing from the scope of the present disclosure. The following description of example embodiments is, therefore, not to be taken in a limiting sense, and the scope of the present disclosure is defined by the appended claims.

The functions or algorithms described herein may be implemented in software or a combination of software and human-implemented procedures in one embodiment. The software may consist of computer-executable instructions stored on computer-readable media or a computer-readable storage device such as one or more non-transitory memories or other types of hardware-based storage devices, either local or networked. Further, such functions correspond to modules, which may be software, hardware, firmware, or any combination thereof. Multiple functions may be performed in one or more modules as desired, and the embodiments described are merely examples. The software may be executed on a digital signal processor, application-specific integrated circuit (ASIC), microprocessor, or other type of processor operating on a computer system, such as a personal computer, server, or other computer system.

In an example embodiment, application textures are stored directly in an application compression format, preserving high quality while transcoding directly in hardware, either partially or completely, from the image compression format to a texture compression format, which reduces bandwidth usage for network-derived content, improves efficiency, reduces memory bandwidth utilization, and reduces power.

In another example embodiment, the trancoding of an image from image compression format to texture compression format includes the splitting of a decoded block of the image into multiple subblocks to minimize the number of colors contained in each subblock. This allows a subsequent encoding of each subblock into texture compression format to be performed using either one or two colors as base colors for an encoding algorithm. The benefit is that the image is converted on the fly from image compression format to texture compression format in a more efficient manner, minimizing processing cycles and storage space, while still gaining the benefit of the reduced bandwidth usage for network-derived content and reduction in power of using a GPU to render texture compression format subblocks.

JPEG images are typically encoded in 8×8 blocks of pixels called minimum coded units (MCUs) in the YCbCr color space. A block may represent a group of neighboring pixels of a certain shape (e.g. a square or other applicable two dimension shape) in an image. In an example embodiment, each of these MCUs is split into multiple blocks and each of these multiple blocks is encoded directly into ETC2 blocks. For example, ETC2 typically handles 4×4 blocks, and thus each 8×8 JPEG block is decoded and split into four different 4×4 blocks, which are then each encoded as separate 4×4 ETC2 blocks.

YCbCr may represent a digital encoding of color information suited for video and still-image compression and transmission such as JPEG. YUV may indicate file formats that are encoded using YcbCr. A color image or video may be encoded using YUV taking human perception into account, allowing reduced bandwidth for chrominance components, thereby typically enabling transmission errors or compression artifacts to be efficiently masked by the human perception than using a "direct" RGB-representation.

Figure 1:
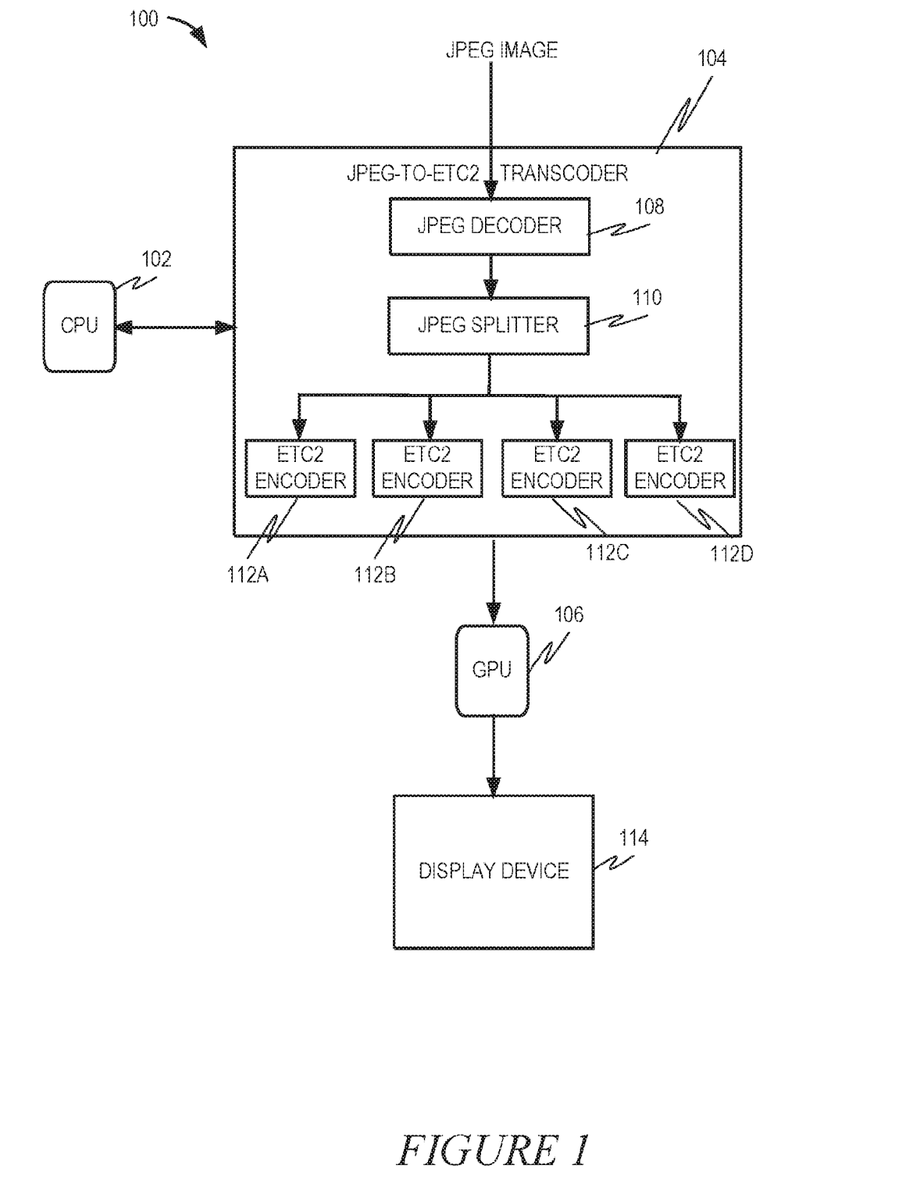
FIG. 1 is a block diagram illustrating a system for hardware JPEG to ETC2 transcoding, in accordance with an example embodiment.

FIG. 1 is a block diagram illustrating a system 100 for hardware JPEG to ETC2 transcoding, in accordance with an example embodiment. In an example embodiment, the system 100 may be located on a single computing device, such as a smartphone, tablet, desktop, laptop, or any other device having a central processing unit 102. However, in some example embodiments, portions of the system 100 may be located on different physical devices than one another. In an example embodiment, the central processing unit 102 may be implemented as a central processing means. Due to the limited-processing capabilities of many smartphones, the system 100 has specific benefit for smartphones as the ability to offload operations to a GPU is especially important in limited-processing environments, but as described above it is not necessary that the system 100 be implemented on a smartphone.

In an example embodiment a hardware JPEG-to-ETC2 transcoder 104 acts to transform JPEG images into ETC2 format. The ETC2 images are then sent to a GPU 106 for processing (and possible display on an optional display device 114). As described above, in some example embodiments not all of the operations involved in JPEG-to-ETC2 transcoding need to be performed in hardware. As such, in an example embodiment, any operations of JPEG-to-ETC2 transcoding not performed by the hardware JPEG-to-ETC2 transcoder 104 may be performed in software by the CPU 102. In an example embodiment, the hardware JPEG-to-ETC2 transcoder 104 may be implemented as a hardware JPEG-to-ETC transcoding means, or some other image compression format to texture compression format transcoding means.

The ETC algorithm operates by compressing 4×4 blocks of pixels. It utilizes vector quantization to choose a small set of values that best fit the original 16 colors. For example, a limited set of colors may be determined for texture compression encoding to compress a 4×4 block of pixels. The limited set of color may have smaller than 16 colors. There are actually different modes used to encode different types of blocks. ETC1 mode is best suited for blocks with different shades of one color while ETC2 mode is best suited for blocks that have shades of two or more different colors.

In ETC1 mode, a block is encoded as 2 sub-blocks, each 2×4. In H mode this block is split horizontally. In T mode this block is split vertically. Additionally, ETC1 mode supports differential encoding, where more data is used for encoding one sub-block than the other.

In ETC2 mode, there are three possible modes: planar, H-mode, and T-mode. ETC2 planar mode is used for encoding a gradient. Three border colors of a gradient are encoded. In ETC2 H-mode, two colors are encoded: C0 and C1, and an offset d. Each pixel is encoded as either C0−d, C0+d, C1−d, or C1+d.

In ETC2 T-mode, two colors are also encoded: C0 and C1, and an offset d. But each pixel as encoded as either C0, C1−d, C1, or C1+d.

In an example embodiment, the hardware JPEG-to-ETC2 transcoder includes a JPEG decoder 108, a JPEG splitter 110, and one or more ETC2 encoders 112A, 112B, 112O and 112D. The JPEG decoder 108 acts to decode the incoming JPEG images into decoded MCU blocks. The term "decoded block" refers to a data structure used to store image information from the decoding of an MCU block, such as output of a JPEG decoder 108 or the like. In an example embodiment, this data structure may comprise an 8×8 table with each entry in the table including color information pertaining to a corresponding pixel in a portion of the original image. In an example embodiment, the JPEG decoder 108 may be implemented as a JPEG decoding means, or some other image compression format decoding means. The JPEG splitter 110 then splits each of these decoded MCU blocks into subblocks. The term "subblock" refers to any division of a block created by the splitting operation performed in the JPEG splitter 110 or the like In an example embodiment, the JPEG splitter 110 may be implemented as a JPEG splitting means, or some other image compression format splitting means. Each subblock is then encoded using an ETC2 encoder 112A-112D. In an example embodiment, any or all of the ETC2 encoders 112A-112D may be implemented as an ETC encoding means, or some other texture compression format encoding means. This process will be described in more detail below.

It should be noted that embodiments are foreseen where other image compression formats than JPEG are utilized, and where other texture compression formats than ETC2 are utilized. In such embodiments, the JPEG-to-ETC2 transcoder 104 may be an image format transcoder, the JPEG decoder 108 may be a decoder, the JPEG splitter 110 may be a splitter, and each ETC2 encoder 112A-112D may be a texture compression encoder.

Figure 2:
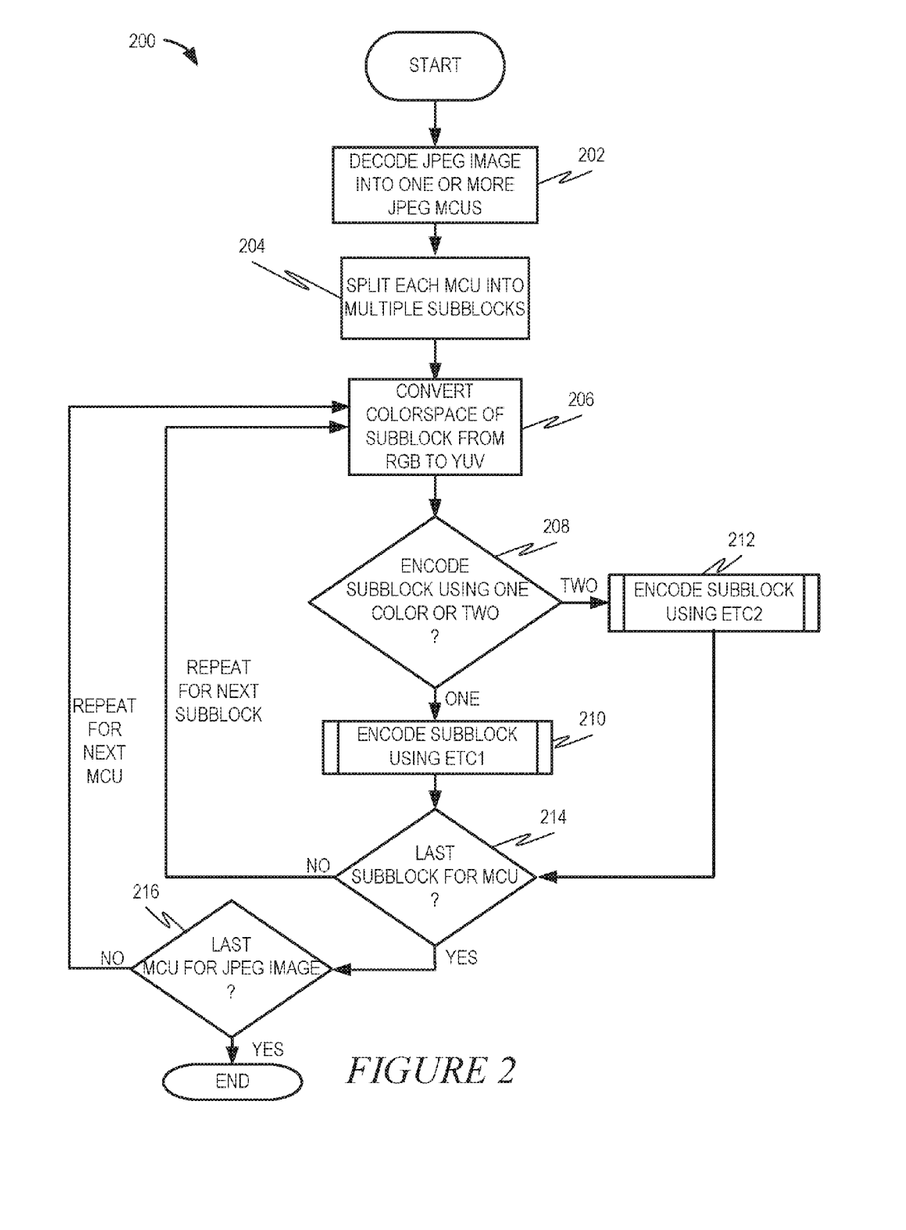
FIG. 2 is a flow diagram illustrating a method for JPEG-ETC2 transcoding, in accordance with an example embodiment.

FIG. 2 is a flow diagram illustrating a method 200 for JPEG-ETC2 transcoding, in accordance with an example embodiment. As described above, one or more of the operations described in this method 200 are performed by the hardware JPEG-to-ETC2 transcoder 104. At operation 202, a JPEG image is decoded into one or more JPEG MCUs, which may be, for example, of size 8×8. At operation 204, each MCU is split into multiple subblocks which may be, for example, of size 4×4. Embodiments where the JPEG MCUs and the resulting subblocks are of different size and quantity than described here, however, are possible, and nothing in this disclosure shall be interpreted as limiting the scope of the disclosure to MCUs of size 8×8 or subblocks of size 4×4.

A loop is then begun for each subblock of each MCU. At operation 206, the colorspace of the subblock is converted from RGB to YUV. Conversion of the RGB colorspace to YUV may be performed using one of many different types of conversion algorithms.

In an example embodiment, the function [R, G, B]=Y'UV444toRGB888(Y', U, V) converts Y'UV format to simple RGB format. The RGB conversion formulae used for Y'UV444 format are also applicable to the standard NTSC TV transmission format of YUV420 (or YUV422 for that matter). For YUV420, since each U or V sample is used to represent four Y samples that form a square, a proper sampling method can allow the utilization of the exact conversion formulae shown below.

These formulae are based on the NTSC standard:

$$Y' = 0.299 \times R + 0.587 \times G + 0.114 \times B$$

$$U = -0.147 \times R - 0.289 \times G + 0.436 \times B$$

$$V = 0.615 \times R - 0.515 \times G - 0.100 \times B$$

An alternative formulation is:

$$C = Y' - 16$$

$$D = U - 128$$

$$E = V - 128$$

Using the previous coefficients and noting that clamp( ) denotes clamping a value to the range of 0 to 255, the following formulae provide the conversion from Y'UV to RGB (NTSC version):

$$R = \text{clamp}((298 \times C + 409 \times E + 128) >> 8)$$

$$G = \text{clamp}((298 \times C - 100 \times D - 208 \times E + 128) >> 8)$$

$$B = \text{clamp}((298 \times C + 516 \times D + 128) >> 8)$$

Y'UV420p is a planar format, meaning that the Y', U, and V values are grouped together instead of interspersed. The reason for this is that by grouping the U and V values together, the image becomes much more compressible. When given an array of an image in the Y'UV420p format, all the Y' values come first, followed by all the U values, followed finally by all the V values.

The Y'V12 format is essentially the same as Y'UV420p, but it has the U and V data switched: the Y' values are followed by the V values, with the U values last. As long as care is taken to extract. U and V values from the proper locations, both Y'UV420p and I'V12 can be processed using the same algorithm.

As with most Y'UV formats, there are as many Y' values as there are pixels. Where X equals the height multiplied by the width, the first X indices in the array are Y' values that correspond to each individual pixel. However, there are only one fourth as many U and V values. The U and V values correspond to each 2 by 2 block of the image, meaning each U and V entry applies to four pixels. After the Y' values, the next X/4 indices are the U values for each 2 by 2 block, and the next X/4 indices after that are the V values that also apply to each 2 by 2 block.

Returning to FIG. 2, at operation 208, UV clustering analysis is used to determine whether it is better to encode the block using one color, two colors, a fixed number or other applicable predetermined numbers. In an example embodiment, this clustering is performed using k-means clustering, which aims to partition n observations into k clusters in which each observation belongs to the cluster with the nearest mean, serving as a prototype of the cluster in an example embodiment, the average color in UV space may be determined, as well as the standard deviation. If the standard deviation is less than a particular threshold, 1 base color may be used for encoding. Otherwise, 2 base colors may be used, and a 2-means clustering is used to find the 2 colors that best fit the data.

If it is one color, then at operation 210 the subblock is encoded using ETC1. If it is two colors, then at operation 212 the subblock is encoded using ETC2.

At operation 214, it is determined if this is the last subblock for the MCU. If not, then the process loops back to operation 206 for the next subblock in the MCU. If so, then at operation 216 it is determined if this is the last MCU for the JPEG image. If not, then the process loops back to operation 206 for the first subblock in the next MCU. If so, then the process ends.

Figure 3:
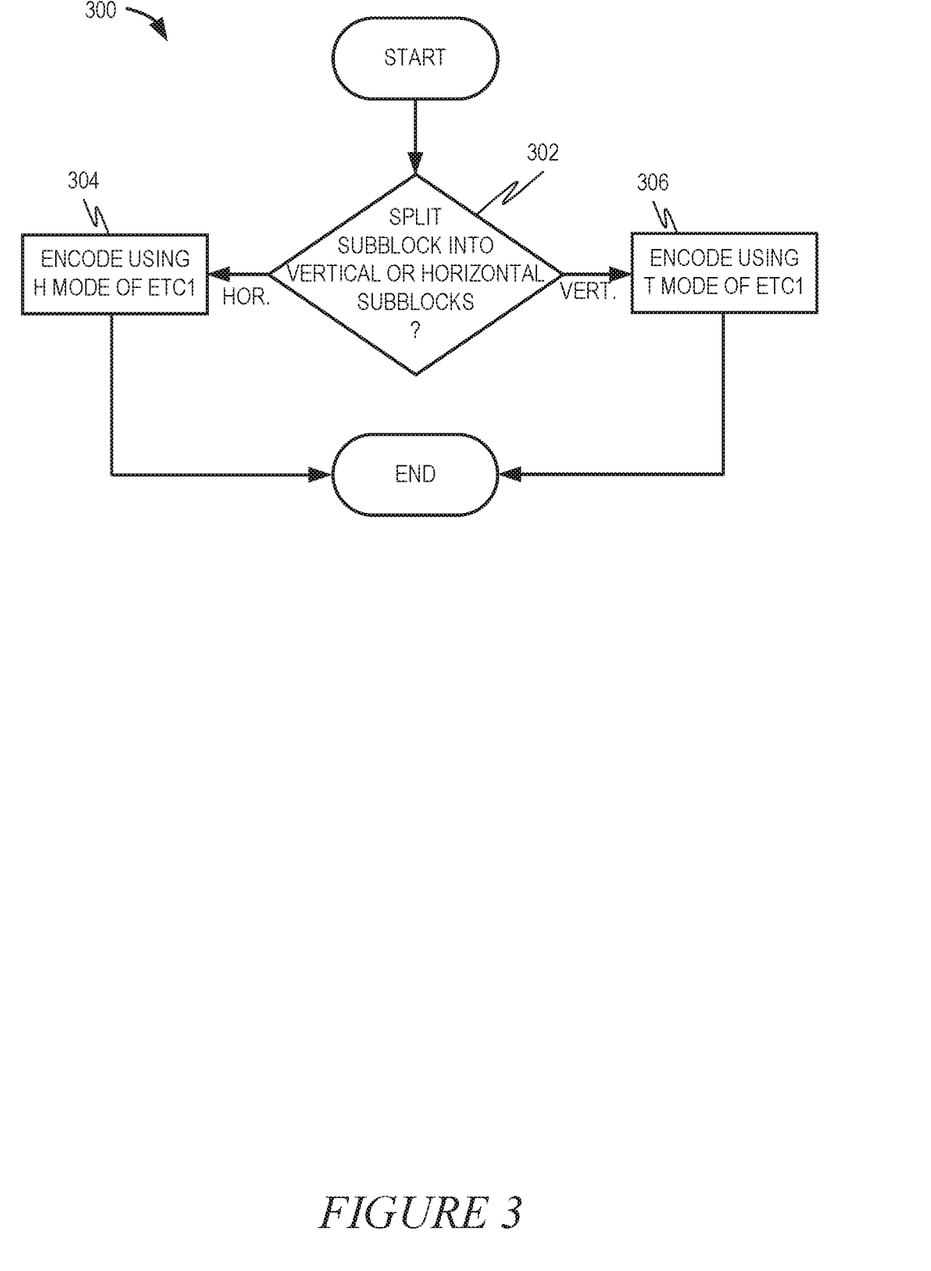
FIG. 3 is a flow diagram illustrating a method of encoding of a subblock using ETC1, in accordance with an example embodiment.

FIG. 3 is a flow diagram illustrating a method 300 of encoding of a subblock using ETC1, in accordance with an example embodiment in some example embodiments, method 300 may be the same as operation 210 in FIG. 2. Here, at operation 302, it is determined whether to split the subblock into vertical or horizontal subblocks. In an example embodiment, this is determined by finding the average color for each vertical subblock, and the standard deviation for each subblock (s1), as well as finding the average color for each horizontal subblock and the standard deviation for each subblock (s2) If s1<s2, then vertical is chosen, otherwise horizontal. If horizontal, then at operation 304, the subblock is encoded using H mode of ETC1. If vertical, then at operation 306, the subblock is encoded using T mode of ETC1.

Figure 4:
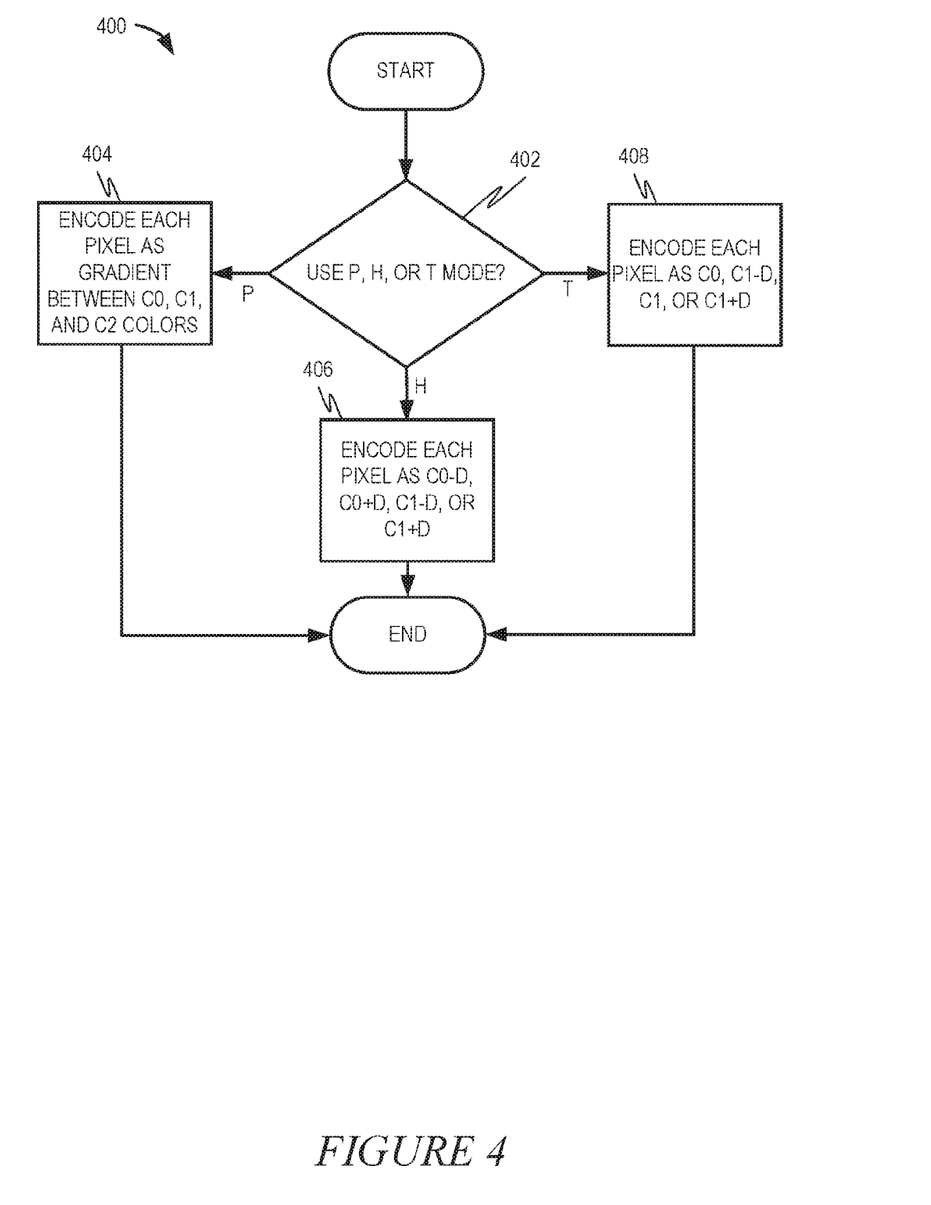
FIG. 4 is a flow diagram illustrating a method of encoding of a subblock using ETC2, in accordance with an example embodiment.

FIG. 4 is a flow diagram illustrating a method 400 of encoding of a subblock using ETC2, in accordance with an example embodiment. In some example embodiments, method 400 may be the same operation as operation 212 in FIG. 2. At operation 402, clustering and analysis is used to determine whether to use P, H, or T mode. If P mode, then at operation 404 each pixel is encoded as a gradient between 3 colors: C0, C1, and C2. If H mode, then at operation 406, each pixel is encoded as C0−d, C0+d, C1−d, or C1+d, where C0 and C1 are two colors. If T mode, then at operation 408, each pixel is encoded as C0, C1−d, C1, or C1+d, where C0 and C1 are two colors.

Figure 5:
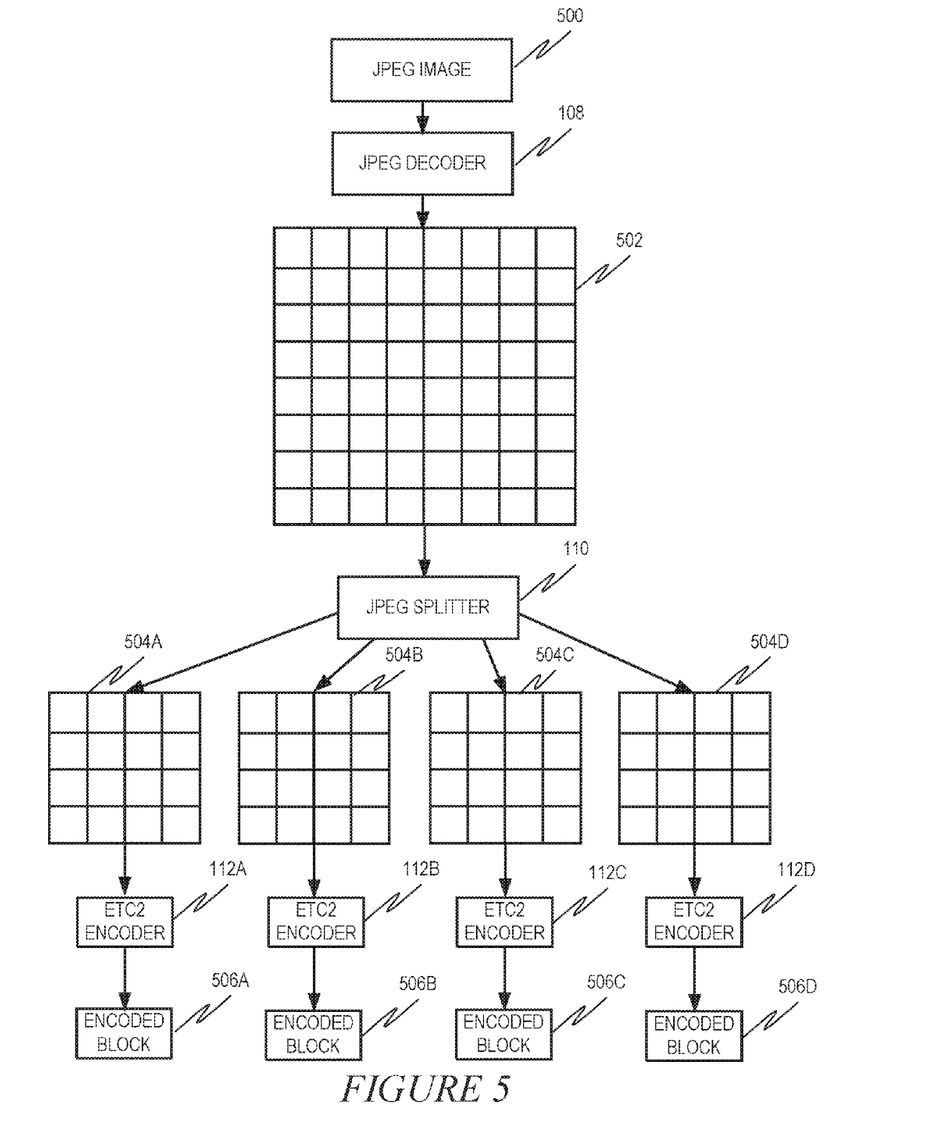
FIG. 5 is a diagram illustrating art example of transcoding of a JPEG image to ETC2 format in accordance with an example embodiment.

FIG. 5 is a diagram illustrating an example of transcoding of a JPEG image 500 to ETC2 format in accordance with an example embodiment. Here, the JPEG image 500 is first decoded into one or more 8×8 MCUs 502 by a JPEG decoder 508. For simplicity, only a single 8×8 MCU is depicted in FIG. 5, but one of ordinary skill in the art will recognize that any number of MCUs may be used for a particular JPEG image 500, and that the MCU size may vary based on implementation. The decoded MCU 502 is then split into four 4×4 decoded blocks 504A, 504B, 504C, and 504D) by a JPEG splitter 110. Each of these 4×4 decoded blocks 504A-504D may then be passed through an ETC2 encoder 112A-112D. This may be performed in a serial fashion using a single ETC2 encoder or may be performed in parallel by using multiple ETC2 encoders 112A-112D as depicted in the figure. The output of each ETC2 encoder 112A-112D is a 4×4 encoded block 506A-506D, which then can each be passed to a GPU for rendering or other graphics-related processes.

It should be noted that while this disclosure describes methods and components used to transcode JPEG format images to ETC2, one of ordinary skill in the art will recognize that the methods and components may be modified to transcode other image formats into other types of texture compression formats.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an application specific integrated circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm) in other example embodiments, the processors or processor-implemented modules may be distributed across a number of geographic locations.

Machine and Software Architecture

The modules, methods, applications and so forth described in conjunction with FIGS. 1-5 are implemented, in some embodiments, in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things" while yet another combination produces a server computer for use within a cloud computing architecture. Not all combinations of such software and hardware architectures are presented here as those of skill in the art can readily understand how to implement the inventive subject matter in different contexts from the disclosure contained herein.

Software Architecture

Figure 6:
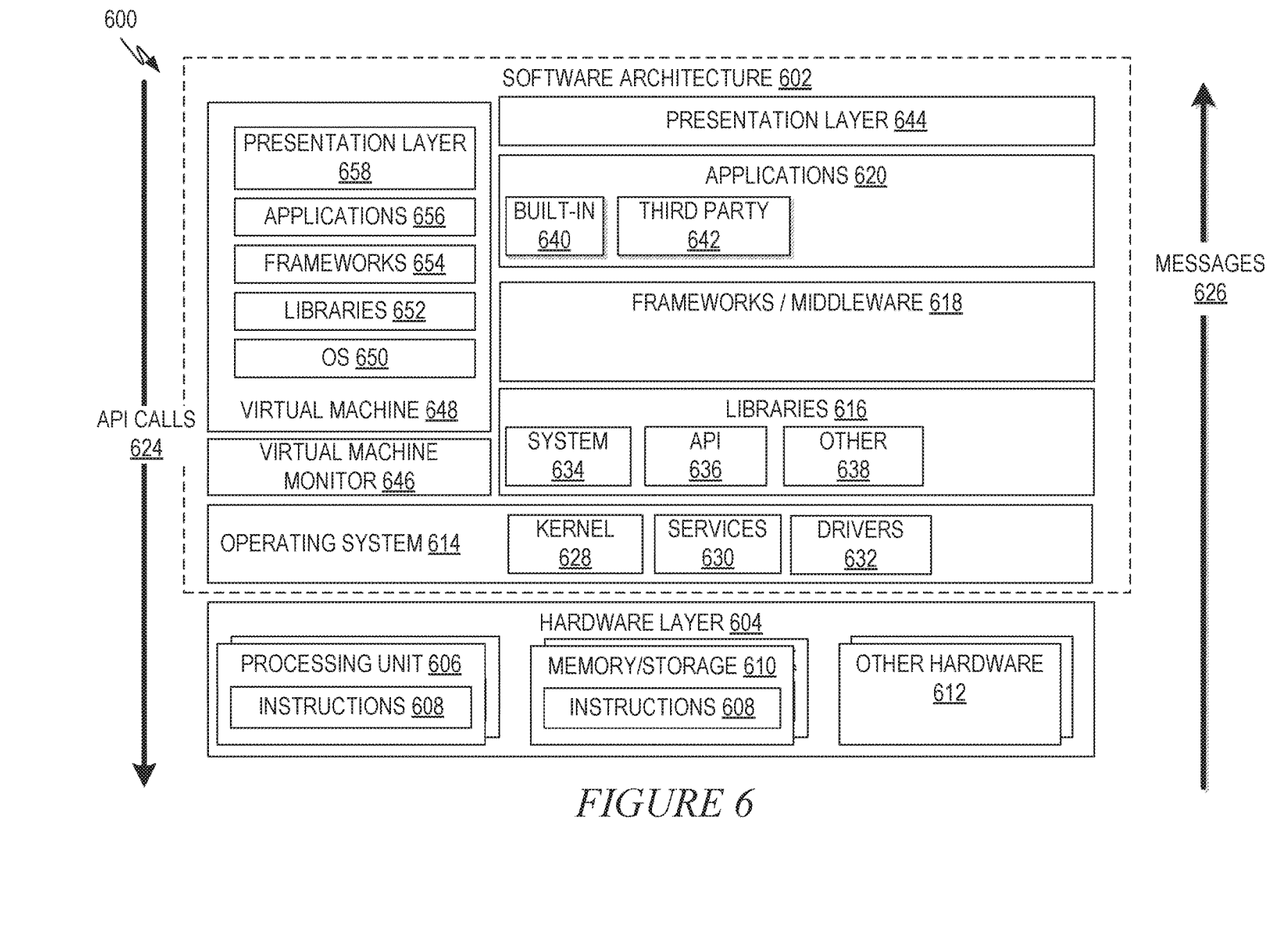
FIG. 6 is a block diagram illustrating a representative software architecture, which may be used in conjunction with various hardware architectures herein described.

FIG. 6 is a block diagram 600 illustrating a representative software architecture 602, which may be used in conjunction with various hardware architectures herein described. FIG. 6 is merely a non-limiting example of a software architecture 602 and it will be appreciated that many other architectures may be implemented to facilitate the functionality described herein. The software architecture 602 may be executing on hardware such as machine 700 of FIG. 7 that includes, among other things, processors 710, memory/storage 730, and I/O components 750. A representative hardware layer 604 is illustrated and can represent, for example, the machine 700 of FIG. 7. The representative hardware layer 604 comprises one or more processing units 606 having associated executable instructions 608. Executable instructions 608 represent the executable instructions of the software architecture 602, including implementation of the methods, modules and so forth of FIGS. 1-5. Hardware layer 604 also includes memory and/or storage modules 610, which also have executable instructions 608. Hardware layer 604 may also comprise other hardware 612 which represents any other hardware of the hardware layer 604, such as the other hardware illustrated as part of machine 700.

In the example architecture of FIG. 6, the software architecture 602 may be conceptualized as a stack of layers where each layer provides particular functionality. For example, the software architecture 602 may include layers such as an operating system 614, libraries 616, frameworks/middleware 618, applications 620 and presentation layer 644. Operationally, the applications 620 and/or other components within the layers may invoke application programming interface (API) calls 624 through the software stack and receive a response, returned values, and so forth illustrated as messages 626 in response to the API calls 624. The layers illustrated are representative in nature and not all software architectures have all layers. For example, some mobile or special purpose operating systems may not provide a frameworks/middleware 618, while others may provide such a layer. Other software architectures may include additional or different layers.

The operating system 614 may manage hardware resources and provide common services. The operating system 614 may include, for example, a kernel 628, services 630, and drivers 632. The kernel 628 may act as an abstraction layer between the hardware and the other software layers. For example, the kernel 628 may be responsible for memory management, processor management (e.g., scheduling), component management, networking, security settings, and so on. The services 630 may provide other common services for the other software layers. The drivers 632 may be responsible for controlling or interfacing with the underlying hardware. For instance, the drivers 632 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 616 may provide a common infrastructure that may be utilized by the applications 620 and/or other components and/or layers. The libraries 616 typically provide functionality that allows other software modules to perform tasks in an easier fashion than to interface directly with the underlying operating system 614 functionality (e.g., kernel 628, services 630 and/or drivers 632). The libraries 616 may include system libraries 634 (e.g., C standard library) that may provide functions such as memory allocation functions, string manipulation functions, mathematic functions, and the like. In addition, the libraries 616 may include API libraries 636 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 616 may also include a wide variety of other libraries 638 to provide many other APIs to the applications 620 and other software components/modules.

The frameworks/middleware 618 (also sometimes referred to as middleware) may provide a higher-level common infrastructure that may be utilized by the applications 620 and/or other software components/modules. For example, the frameworks/middleware 618 may provide various graphic user interface (GUI) functions, high-level resource management, high-level location services, and so forth. The frameworks/middleware 618 may provide a broad spectrum of other APIs that may be utilized by the applications 620 and/or other software components/modules, some of which may be specific to a particular operating system or platform.

The applications 620 include built-in applications 640 and/or third-party applications 642. Examples of representative built-in applications 640 may include, but are not limited to, a contacts application, a browser application, a book reader application, a location application, a media application, a messaging application, and/or a game application. Third-party applications 642 may include any of the built-in applications 640 as well as a broad assortment of other applications. In a specific example, the third-party application 642 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 642 may invoke the API calls 624 provided by the mobile operating system such as operating system 614 to facilitate functionality described herein.

The applications 620 may utilize built-in operating system functions (e.g., kernel 628, services 630 and/or drivers 632), libraries (e.g., system libraries 634, API libraries 636, and other libraries 638), frameworks/middleware 618 to create user interfaces to interact with users of the system. Alternatively, or additionally, in some systems, interactions with a user may occur through a presentation layer, such as presentation layer 644. In these systems, the application/module "logic" can be separated from the aspects of the application/module that interact with a user.

Some software architectures utilize virtual machines. In the example of FIG. 6, this is illustrated by virtual machine 648. A virtual machine creates a software environment where applications/modules can execute as if they were executing on a hardware machine (such as the machine 700 of FIG. 7, for example). A virtual machine 648 is hosted by a host operating system (operating system 614 in FIG. 7) and typically, although not always, has a virtual machine monitor 646, which manages the operation of the virtual machine 648 as well as the interface with the host operating system (i.e., operating system 614). A software architecture executes within the virtual machine 648 such as an operating system 650, libraries 652, frameworks/middleware 654, applications 656 and/or presentation layer 658. These layers of software architecture executing within the virtual machine 648 can be the same as corresponding layers previously described or may be different.

Example Machine Architecture and
Machine-Readable Medium

Figure 7:
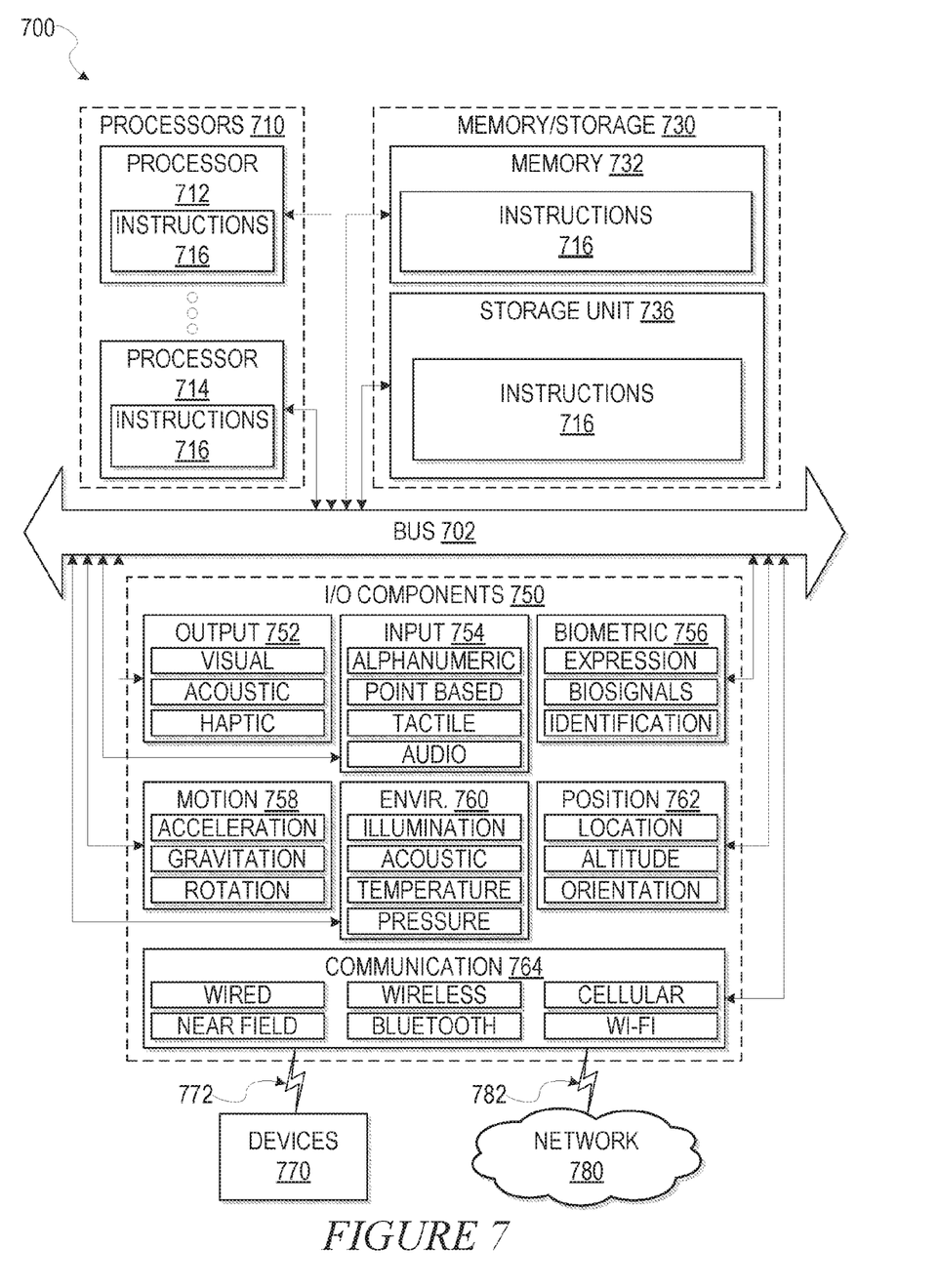
FIG. 7 is a block diagram illustrating components of a machine, according to some example embodiments, able to read instructions from a machine-readable medium (e.g., a machine-readable storage medium) and perform any one or more of the methodologies discussed herein.

FIG. 7 is a block diagram illustrating components of a machine 700, according to some example embodiments, able to read instructions 716 from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 716 (e.g., software, a program, an application, an applet, app, or other executable code) for causing the machine 700 to perform any one or more of the methodologies discussed herein may be executed. For example, the instructions 716 may cause the machine 700 to execute the flow diagrams of FIGS. 1-5. Additionally, or alternatively, the instructions 716 may implement modules of FIGS. 1-5, and so forth. The instructions 716 transform the general, non-programmed machine 700 into a particular machine programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory/storage 730, and I/O components 750, which may be configured to communicate with each other such as via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, processor 712 and processor 714 that may execute instructions 716. The term "processor" is intended to include multi-core processor 712, 714 that may comprise two or more independent processors 712, 714 (sometimes referred to as "cores") that may execute instructions 716 contemporaneously. Although FIG. 7 shows multiple processors 710, the machine 700 may include a single processor 712, 714 with a single core, a single processor 712, 714 with multiple cores (e.g., a multi-core processor 712, 714), multiple processors 712, 714 with a single core, multiple processors 712, 714 with multiples cores, or any combination thereof.

The memory/storage 730 may include a memory 732, such as a main memory, or other memory storage, and a storage unit 736, both accessible to the processors 710 such as via the bus 702. The storage unit 736 and memory 732 store the instructions 716 embodying any one or more of the methodologies or functions described herein. The instructions 716 may also reside, completely or partially, within the memory 732, within the storage unit 736, within at least one of the processors 710 (e.g., within the processor 712, 714's cache memory), or any suitable combination thereof, during execution thereof by the machine 700. Accordingly, the memory 732, the storage unit 736, and the memory of processors 710 are examples of machine-readable media.

As used herein, "machine-readable medium" means a device able to store instructions 716 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" should be taken to include a single medium or multiple media (e.g., a centralized or distributed database, or associated caches and servers) able to store instructions 716. The term "machine-readable medium" shall also be taken to include any medium, or combination of multiple media, that is capable of storing instructions (e.g., instructions 716) for execution by a machine (e.g., machine 700), such that the instructions 716, when executed by one or more processors of the machine 700 (e.g., processors 710), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 750 may include a wide variety of components to receive input, provide output, produce output, transmit information, exchange information, capture measurements, and so on. The specific I/O components 750 that are included in a particular machine will depend on the type of machine 700. For example, portable machines such as mobile phones will likely include a touch input device or other such input mechanisms, while a headless server machine will likely not include such a touch input device it will be appreciated that the I/O components 750 may include many other components that are not shown in FIG. 7. The I/O components 750 are grouped according to functionality merely for simplifying the following discussion and the grouping is in no way limiting. In various example embodiments, the I/O components 750 may include output components 752 and input components 754. The output components 752 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 758, environmental components 760, or position components 762 among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 762 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via coupling 782 and coupling 772 respectively. For example, the communication components 764 may include a network interface component or other suitable device to interface with the network 780. In further examples, communication components 764 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., a peripheral device coupled via a Universal Serial Bus (USB)).

Moreover, the communication components 764 may detect identifiers or include components operable to detect identifiers. For example, the communication components 764 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 780 may be an ad hoc network, an intranet, an extranet, a virtual private network (VPN), a local area network (LAN), a wireless LAN (WLAN), a wide area network (WAN), a wireless WAN (Vs/WAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network and the coupling 782 may be a Code Division Multiple Access (CDMA) connection, a Global System for Mobile communications (GSM) connection, or other type of cellular or wireless coupling. In this example, the coupling 782 may implement any of a variety of types of data transfer technology, such as Single Carrier Radio Transmission Technology (1xRTT), Evolution-Data Optimized (EVDO) technology, General Packet. Radio Service. (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., hypertext transfer protocol (HTTP)). Similarly, the instructions 716 may be transmitted or received using a transmission medium via the coupling 772 (e.g., a peer-to-peer coupling) to devices 770. The term "transmission medium" shall be taken to include any intangible medium that is capable of storing, encoding, or carrying instructions 716 for execution by the machine 700, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
   a graphical processing unit (GPU);
   an image format transcoder to convert an image stored in an image compression format into a plurality of blocks represented in a texture compression format, the image format transcoder comprising:
      a decoder to decode the image into one or more decoded blocks;
      a splitter to split each decoded block into multiple decoded subblocks; and
      a texture compression format encoder configured to perform operations comprising:
         determining a standard deviation of a plurality of colors within a chrominance (UV) color space associated with a particular one of the multiple decoded subblocks; and
         encoding the particular one of the multiple decoded subblocks into a particular one of the blocks in the texture compression format using a limited set of colors, wherein the limited set of colors includes a smaller number of colors than the plurality of colors, the smaller number of colors determined based on the standard deviation of the plurality of colors; and
   a bus to transfer the particular one block of the texture compression format to the GPU for processing.

2. The system of claim 1, wherein the limited set of colors includes no more than one color and wherein the decoded subblock is encoded using Ericsson Texture Compression 1 (ETC1).

3. The system of claim 2, wherein the encoding of the decoded subblock using ETC1 comprises:
   determining whether to encode the decoded subblock using vertical or horizontal subblocks; and
   in response to a determination that the decoded subblock should be encoded using horizontal subblocks, encoding the decoded subblock using an H mode of ETC1.

4. The system of claim 3, wherein the encoding of the decoded subblock using ETC1 further comprises:
   in response to a determination that the decoded subblock should be encoded using vertical subblocks, encoding the decoded subblock using a T mode of ETC1.

5. The system of claim 3, wherein the determining whether to encode the decoded subblock using vertical or horizontal subblocks includes:
   finding an average color and a standard deviation of colors in each vertical subblock of the decoded subblock;
   finding an average color and a standard deviation of colors in each horizontal subblock of the decoded subblock; and
   concluding that the decoded subblock should be encoded using vertical subblocks if the standard deviation for the vertical subblocks is less than the standard deviation for the horizontal subblocks.

6. The system of claim 1, wherein the operations of the texture compression format encoder further comprise:
   in response to a determination that the decoded subblock should be encoded using two colors, performing 2-means clustering operations to determine two colors from the decoded subblock for encoding; and
   encoding the decoded subblock based on Ericsson Texture Compression 2 (ETC2) with the determined two colors.

7. The system of claim 1, wherein the texture compression format encoder is configured to determine the number of colors in the limited set of colors to encode the decoded subblock, the determining of the number of colors including:
computing average color in the decoded subblock and the standard deviation among the plurality of colors in the decoded subblock; and
comparing the standard deviation to a set threshold, wherein the decoded subblock is to be encoded using two colors if the standard deviation transgresses the set threshold, otherwise the decoded subblock is to be encoded using one color.

8. A system comprising:
a graphical processing unit (GPU);
a Joint Photographic Experts Group (JPEG)-to-Ericsson Texture Compression 2 (ETC2) transcoder to convert a JPEG image into a plurality of ETC2 blocks, the JPEG-to-ETC2 transcoder comprising:
a JPEG decoder to decode the JPEG image into one or more decoded blocks;
a JPEG splitter to split each decoded block into multiple decoded subblocks, each subblock having a plurality of colors;
one or more ETC2 encoders configured to:
determine a standard deviation of a plurality of colors within a chrominance (UV) color space associated with each of the multiple decoded subblocks;
encode each of the multiple decoded subblocks into a plurality of ETC2 blocks, wherein each of the multiple decoded subblocks is encoded using a limited set of colors, the limited set of colors based on the determined standard deviation among the plurality of colors within the UV color space; and
a bus to transfer the plurality of ETC2 blocks to the GPU for processing.

9. The system of claim 8, wherein the JPEG splitter is designed to split each decoded block into a fixed number of decoded subblocks and the system comprises a number of ETC2 encoders equal to the fixed number.

10. The system of claim 8, wherein the one or more ETC2 encoders are hardware ETC2 encoders.

11. The system of claim 8, wherein at least one of the one or more ETC2 encoders is a software ETC2 encoder.

12. The system of claim 8, wherein the JPEG decoder is a hardware JPEG decoder.

13. The system of claim 8, wherein the JPEG decoder is a software JPEG decoder.

14. A non-transitory computer-readable storage medium comprising instructions that, when executed by at least one processor of a machine, cause the machine to perform operations comprising:
receiving a Joint Photographic Experts Group (JPEG) image, the JPEG image comprising one or more minimum coded units (MCUs);
decoding each MCU using a JPEG decoder;
splitting each decoded MCU into multiple decoded subblocks, each subblock having a plurality of colors;
determining a standard deviation of a plurality of colors within a chrominance (UV) color space associated with each of the multiple decoded subblocks;
encoding each decoded subblock of the multiple decoded subblocks into Ericsson Texture Compression 2 (ETC2) using an ETC2 encoder, wherein each of the multiple decoded subblocks is encoded using a limited set of colors, the limited set of colors based on the determined standard deviation among the plurality of colors within the UV color space; and
passing each encoded ETC2 subblock to a graphical processing unit (GPU) for processing.

15. The non-transitory computer-readable storage medium of claim 14, wherein the encoding includes, for each decoded subblock:
converting a color space of the decoded subblock to YUV;
determining if the decoded subblock should be encoded using one color or two colors; and
in response to a determination that the decoded subblock should be encoded using one color, encoding the decoded subblock using Ericsson Texture Compression 1 (ETC1).

16. The non-transitory computer-readable storage medium of claim 15, wherein the encoding further includes, for each decoded subblock:
in response to a determination that the decoded subblock should be encoded using two colors, using a 2-means clustering algorithm to determine two colors from the decoded subblock to use for encoding and encoding the decoded subblock using ETC2 with the determined two colors.

17. The non-transitory computer-readable storage medium of claim 15, wherein the determining includes:
computing an average color in the decoded subblock and standard deviation among the colors in the decoded subblock;
comparing the standard deviation to a set threshold; and
if the standard deviation transgresses the set threshold, determining that the decoded subblock should be encoded using two colors, otherwise determining that the decoded subblock should be encoded using one color.

18. The non-transitory computer-readable storage medium of claim 15, wherein the encoding the decoded subblock using ETC1 comprises:
determining whether to encode the decoded subblock using vertical or horizontal subblocks; and
in response to a determination that the decoded subblock should be encoded using horizontal subblocks, encoding the decoded subblock using an H mode of ETC1.

19. The non-transitory computer-readable storage medium of claim 18, wherein the encoding the decoded subblock using ETC1 further comprises:
in response to a determination that the decoded subblock should be encoded using vertical subblocks, encoding the decoded subblock using a T mode of ETC1.

20. The non-transitory computer-readable storage medium of claim 18, wherein the determining whether to encode the decoded subblock using vertical or horizontal subblocks includes:
finding an average color and a standard deviation of colors in each vertical subblock of the decoded subblock;
finding an average color and a standard deviation of colors in each horizontal subblock of the decoded subblock; and
concluding that the subblock should be encoded using vertical subblocks if the standard deviation for the vertical subblocks is less than the standard deviation for the horizontal subblocks.

* * * * *